(12) United States Patent
Levande et al.

(10) Patent No.: US 9,800,913 B2
(45) Date of Patent: Oct. 24, 2017

(54) ATTRIBUTION OF HOUSEHOLD VIEWERSHIP INFORMATION TO INDIVIDUALS

(71) Applicant: Rentrak Corporation, Portland, OR (US)

(72) Inventors: Paul Levande, New York, NY (US); Bradley Baillod, Brooklyn, NY (US); David Algranati, Rahway, NJ (US)

(73) Assignee: comScore, Inc., Reston, VA (US)

( * ) Notice: Subject to any disclaimer, the term of this patent is extended or adjusted under 35 U.S.C. 154(b) by 0 days.

(21) Appl. No.: 15/065,786

(22) Filed: Mar. 9, 2016

(65) Prior Publication Data

US 2016/0269766 A1 Sep. 15, 2016

Related U.S. Application Data

(60) Provisional application No. 62/130,437, filed on Mar. 9, 2015.

(51) Int. Cl.
| | |
|---|---|
| *H04H 60/32* | (2008.01) |
| *H04N 21/258* | (2011.01) |
| *H04N 21/25* | (2011.01) |
| *H04N 21/466* | (2011.01) |
| *H04N 21/658* | (2011.01) |

(52) U.S. Cl.
CPC ..... *H04N 21/25883* (2013.01); *H04N 21/252* (2013.01); *H04N 21/25891* (2013.01); *H04N 21/4661* (2013.01); *H04N 21/6582* (2013.01)

(58) Field of Classification Search
CPC ............ H04N 21/25883; H04N 21/252
See application file for complete search history.

(56) References Cited

U.S. PATENT DOCUMENTS

| | | | |
|---|---|---|---|
| 9,071,370 B2* | 6/2015 | Toner | H04N 21/251 |
| 2012/0260278 A1* | 10/2012 | Lambert | H04H 60/45 725/14 |
| 2016/0249098 A1* | 8/2016 | Pecjak | H04N 21/44222 |

* cited by examiner

*Primary Examiner* — Oschta Montoya
(74) *Attorney, Agent, or Firm* — Baker & Hostetler LLP

(57) ABSTRACT

A system and method for the assignment of person-level viewership. The system receives viewership information describing the viewing of video content at a household. The system additionally receives demographic information for that household, including the numbers of persons associated with the household. For each combination of viewers, the system calculates the probability that the viewers viewed the content based on the demographic attributes of those viewers and the probabilities that individuals sharing those attributes would view the content. The system then attributes the viewing information to one or more persons from the household based on the calculated probabilities. The system additionally updates the probabilities that individuals having different demographic attributes would view the content based on the selection of persons.

18 Claims, 10 Drawing Sheets

| Education (Highest Level) |
|---|
| Less than High School |
| High School |
| Some College |
| College Degree |
| Graduate Degree |

| Age/Gender | |
|---|---|
| M18-20 | F18-20 |
| M21-24 | F21-24 |
| M25-34 | F25-34 |
| M35-49 | F35-49 |
| M50-54 | F50-54 |
| M55-64 | F55-64 |
| M65+ | F65+ |

*FIG. 2*

| Number of people in household | Possible assignment combinations |
|---|---|
| 1 | 1 |
| 2 | 3 |
| 3 | 7 |
| 4 | 15 |
| 5 | 31 |
| 6 | 63 |

*FIG. 3*

| Genre | Transactions | Viewers | Ratio |
|---|---|---|---|
| Comedy | 4,466,561 | 7,640,664 | 1.71 |
| Drama | 11,052,278 | 18,480,014 | 1.67 |
| Animation | 1,332,792 | 2,150,654 | 1.61 |
| Documentary | 953,119 | 1,536,349 | 1.61 |
| Movies | 132,825 | 193,606 | 1.46 |
| Reality | 5,666,611 | 7,570,653 | 1.34 |
| Talk | 115,416 | 137,302 | 1.19 |
| Game Show | 64,108 | 66,109 | 1.03 |
| HGHI | 397,097 | 407,154 | 1.03 |
| News | 3,820 | 3,839 | 1.00 |
| Sports | 1,361 | 1,366 | 1.00 |
| All Other | 6,577,290 | 6,920,929 | 1.05 |
| Total | 30,763,278 | 45,108,639 | 1.47 |

*FIG. 6*

| Daypart | M18-34 | W18-34 | College Degree Index | A65+ |
|---|---|---|---|---|
| M-F 23:30-02:00 | 109 | 109 | 83 | 78 |
| M-F 02:00-05:00 | 102 | 99 | 76 | 85 |
| M-F 05:00-09:00 | 95 | 107 | 89 | 70 |
| M-F 09:00-15:00 | 104 | 116 | 88 | 73 |
| M-F 15:00-17:00 | 99 | 111 | 91 | 70 |
| M-F 17:00-19:00 | 100 | 113 | 93 | 69 |
| M-F 19:00-20:00 | 100 | 110 | 100 | 75 |
| M-F 20:00-23:00 | 103 | 112 | 102 | 71 |
| M-F 23:00-23:30 | 105 | 111 | 91 | 75 |

*FIG. 7*

ATTRIBUTION OF HOUSEHOLD VIEWERSHIP INFORMATION TO INDIVIDUALS

CROSS-REFERENCE TO RELATED APPLICATION(S)

This application claims the benefit of U.S. Patent Application No. 62/130,437, entitled "PERSON LEVEL VIEWERSHIP ASSIGNMENT," filed Mar. 9, 2015, which is incorporated herein by reference in its entirety.

BACKGROUND

Playback devices in video distribution systems, such as set-top boxes, televisions, and personal computers, often report the viewing activities of those devices. This reported activity data, or viewership information, may indicate what media content, advertising content, or television network was being displayed on a given video playback device at a particular time. The viewership information can be used for a variety of purposes, but is often used by networks and other content providers to set rates for show advertisers.

Viewership information typically identifies the playback device at which the viewing activity was observed, the household in which the viewing activity was observed, or some other identifier associated with a collection of aggregated viewing activities (e.g., viewing activities of a neighborhood). The viewership information, however, often fails to identify any particular viewer associated with the viewing activity. That is, the viewership information reflects the combined viewing activities of multiple viewers, rather than the viewing activity of any individual. For example, if multiple people live in a household, the viewership information associated with an individual set-top box or household will generally capture the viewing habits of the multiple viewers who use the set-top box or live in the household, without identifying which of the set-top box users or household members were viewing content at a particular time. As a result, networks and content providers are forced to set advertising rates based on incomplete data, without knowing the individual viewing habits within a household. If, however, they had information regarding which individuals were viewing which content, they could more effectively set advertising rates (such as, for example, increasing the advertising rate for media content popular with individuals associated with a target demographic). It would therefore be beneficial to facilitate a per-person assignment of individual viewers to reported viewership information.

BRIEF DESCRIPTION OF THE DRAWINGS

FIG. 2 is a table illustrating example demographic breakdowns as may be used by the system.

FIG. 3 is a table illustrating the possible combinations of viewers for households of different sizes.

FIG. 6 is an example table illustrating an example output of the system, showing ratios of viewers to transactions for different content genres.

FIG. 7 is an example table illustrating an example output of the system, showing relative concentrations of content viewership for different demographics across different days and times.

DETAILED DESCRIPTION

Figure 1:
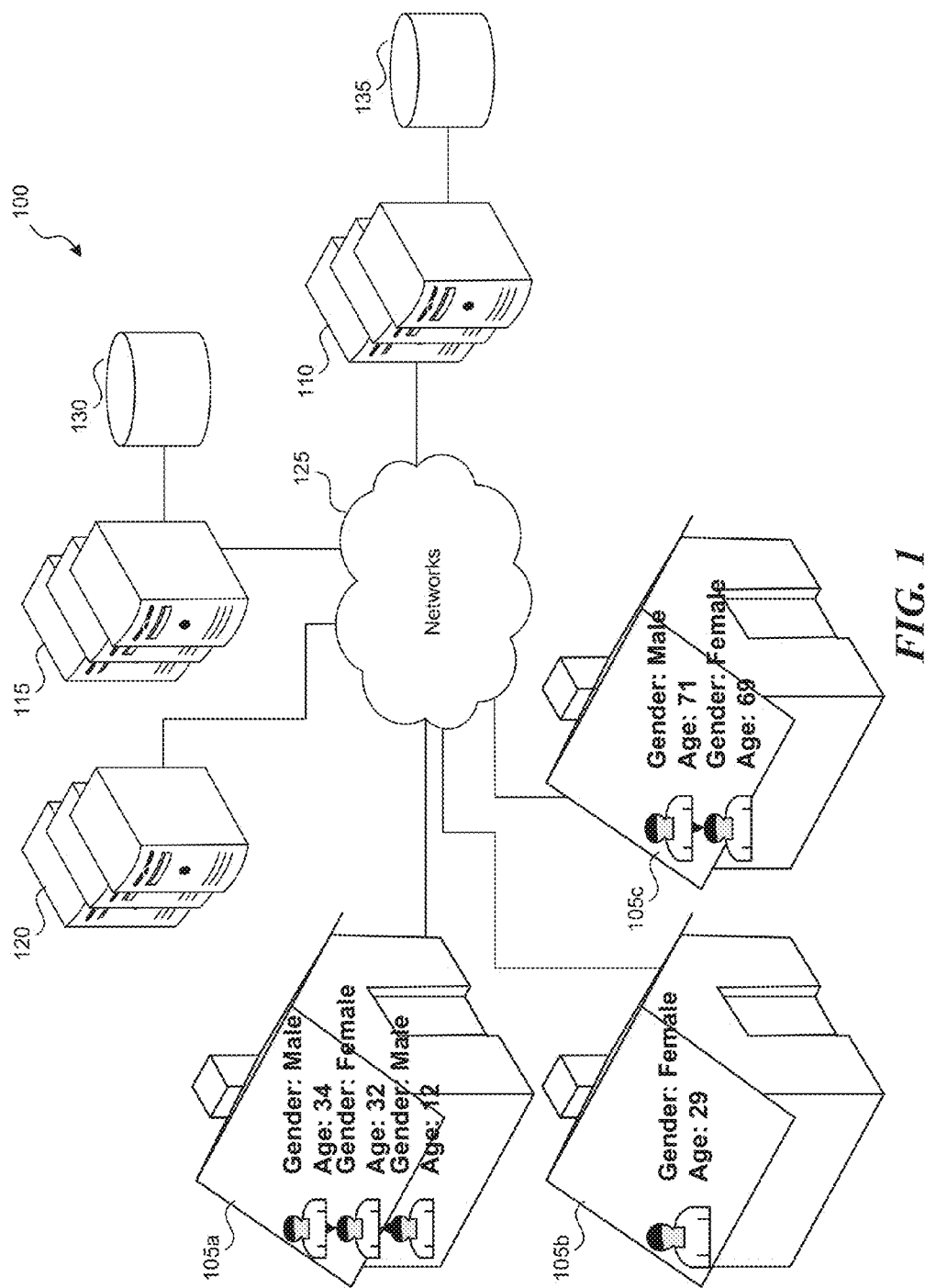
FIG. 1 is a diagram of an example environment in which a system for attributing household viewership information to individuals may operate.

A system and method for attributing household viewership information to individuals, by estimating which individuals in a household viewed a given piece of media content or advertising content, is disclosed herein.

The system receives viewership information that describes the viewing activities of video playback devices within a plurality of households. In particular, the viewership information identifies which media content, advertising content, or television network was being viewed in those households at different times. The viewing information may capture, for example, the viewing activities of live television viewing. The viewing information may also capture viewing activities of video-on-demand ("VOD") viewing (such as a request, or transaction, for VOD content) or Internet streaming. Video playback devices may include televisions, monitors, set-top boxes, digital video recorders, personal computers, or any other electronic device associated with a household through which viewers may tune to or request the retrieval of video content. A household, as used herein, refers to a unit of residence (or other viewing location, such as a business) where video playback devices are located.

The viewership information may be reported at the level of video playback devices, at the level of households, or at some other level associated with a collection of aggregated viewers. The viewership information may be based on, for example, combining tune event data (e.g., indications of when a video playback device was powered on or off, when the channel or volume was changed, when video was retrieved in response to a viewer request, etc.) with a content schedule for the channel to which the video playback device was tuned. Viewership information may additionally be based on video transactions, such as requests for VOD content, time-shifted video playback from a digital video recorder, and retrieval of Internet video. That is, information on what content was viewed in a household, as reflected in the viewership information, may be determined differently depending on the type of viewing (i.e., live viewing compared to on-demand viewing). The viewership information may also include information characterizing the content that was viewed, such as the genre of the content.

In addition to the viewership information, the system also receives demographic data. The demographic data may be associated with individual households or with larger geographic areas encompassing multiple households. The demographic data includes information describing the occupants of a household (or reflecting the aggregate of households within a geographic area), such as the number of household occupants, the age and gender of household occupants, the education level of household occupants, the employment information of household occupants, and the purchase history of household occupants.

As described herein, the system uses the received viewership information and demographic data to estimate individual viewership within the viewing households. For example, if viewership information is received for a household having four people, the system evaluates the probabilities that each of the four people (and combinations of the four) viewed the content reflected in the viewership information, and assigns the four people to the viewership information accordingly. The system may additionally use an adjustment factor to account for the fact that the viewing habits of people within a household may not be independent from one another. Different adjustment factors may be used depending on the popularity of content (e.g., more popular content may have more viewing dependence within a household). Furthermore, the popularity of content may be scaled, prior to selecting an adjustment factor, by a scale factor that accounts for differences in viewership between different distribution networks and viewing types (e.g., live viewership as compared to on-demand viewership). By analyzing the viewership information and demographic data to attribute viewership information to individuals, interested parties, such as networks and content providers, can gain greater insight into which individuals, and not simply which households, viewed a particular piece of content.

Various embodiments of the invention will now be described. The following description provides specific details for a thorough understanding and an enabling description of these embodiments. One skilled in the art will understand, however, that the invention may be practiced without many of these details. Additionally, some well-known structures or features may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Environments

FIG. 1 and the following discussion provide a brief, general description of a suitable environment in which a system for attributing household viewership information to individuals may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions may reside on a client computer.

Referring to the example of FIG. 1, a representative environment 100 in which aspects of the described technology may operate includes one or more viewing households 105a, 105b, . . . 105n, server computers 110, and third-party servers operated by a content distributor 115 and a demographics provider 120. The viewing households 105, server computers 110, content distributor servers 115 and demographics provider servers 120 communicate with each other through public or private networks 125 including, for example, the Internet. Aspects of the system for attributing viewership information may be practiced by the server computers 110, third-party servers 115 and 120, and video playback devices associated with the viewing households 105.

Devices in each of the viewing households 105 or services accessed by those households report viewership information describing viewing activities within the household. The viewership information may, for example, describe what content was displayed on video playback devices within each household at a particular time. The viewership information may report on "live" viewing, such as the viewing of content being broadcast over-the-air or through a cable, satellite, or Internet provider at the time of viewing. The viewership information may report on the viewing of content that was previously recorded, such as through the use of a digital video recorder ("DVR"). And the viewership information may report on the viewing of requested content, such as through a video-on-demand ("VOD") system operated by a cable or satellite provider or through video retrieved through the Internet. Viewership information may be transmitted to the server computers 110 by video playback devices in the households 105, by the content distributor servers 115, or by any other service providers providing services to the households 105. Reported viewership information is accumulated and stored, such as in a viewing database 130 associated with the content distributor servers 115. The viewing database 130 may also maintain information about the viewed content, such as a description of the content, the genre of the content, an audience suitability rating of the content (e.g., the Motion Picture Association of America's film-rating system), and a critical rating of the content.

Each of the households 105 is characterized by demographic information, such as the number of occupants in the household and attributes of each of the individual occupants, such as their age, gender, highest education level, income bracket, purchase history, etc. For example, as illustrated in FIG. 1, household 105*a* has three occupants: a 34 year old male, a 32 year old female, and a 12 year old male. As a further example, household 105*b* has a single occupant: a 29 year old female. Demographic information associated with households 105 may be maintained by a demographics provider server 120. The demographics provider server 120 may categorize individuals' demographic information into different buckets or categories, such as those illustrated in the example table in FIG. 2. Demographic information may be available from the demographics provider server 120 on a household-by-household basis (i.e., each household is individually described), on a neighborhood basis, on a ZIP code basis, or some other basis representing a collection of multiple households. When demographic information is not available for an individual household, the viewership attribution system may treat that household as having the average demographic characteristics of the neighborhood or ZIP code in which the household is located, or may interpolate the average demographic characteristics of multiple neighboring regions.

On a continuous or periodic basis, the server computer 110 receives viewership information associated with households 105. The viewership information may be received by the server computer 110 from the households 105, from the content distributor servers 115, or a combination of the two. The server computer 110 also receives demographic information, such as from the demographics provider server 120. As described herein, the server computer 110 generates predictions about whether each individual did or did not watch video content viewed in the household based on the demographic information of households and the characteristics of the viewed content.

FIG. 3 is a table that depicts possible permutations of viewers depending on the size of a household. As illustrated in FIG. 3, households with more occupants have more combinations of possible viewers who may have viewed the content. For example, a household of four viewers has fifteen combinations of viewers, encompassing different combinations of single viewers, the combinations of two viewers, etc. To attribute viewership information for a household (i.e., to determine in a household of n viewers, which of those up to n viewers watched each piece of content viewed in the household, as reflected in the household viewership information), the server computer 110 evaluates the individual viewing probabilities for each household occupant.

A household occupant's individual viewing probabilities for certain content may be based on observed or estimated viewings of that content by viewers having demographic characteristics matching the household occupant. For example, the individual viewing probability may be selected to equal the number of people having a certain demographic characteristic who watched a television show, divided by the total number of people having that demographic characteristic. As a further example, the individual viewing probability may be based on the number of viewing transactions associated with the show from the demographic of interest. In addition to assigning individual viewing probabilities based on demographics for a particular piece of content (i.e., probabilities that individuals having certain demographic characteristics watch a particular show), the system may also utilize demographics-based individual viewing probabilities for a genre, for shows having a particular overall popularity, and for shows associated with a particular content distributor (such as a television network). Referring to FIG. 1, individual viewing probabilities, such as in a table or other format, may be maintained in storage area 135. As described herein, the various individual viewing probabilities may be initially trained by the system, and may be further updated over time as the system evaluates additional viewership information.

When estimating which individuals viewed content based on individual viewing probabilities, in some embodiments the system may treat the viewing behaviors of individuals within a household as being independent. That is, the system may attribute viewed content to an individual without regard for whether the system assigned or did not assign others in the household to viewing the content. For example, consider a household with two occupants, where $p1$ is the probability that an individual with demographics matching the first occupant would watch a piece of content, where $p2$ is the probability that an individual with demographics matching the second occupant would watch the piece of content, where it is known that the household viewed the content (such as from the viewership information), and assuming independent viewing of the two occupants. The Bayesian probability that the first occupant watched the content and that the second occupant did not watch the content, given that the household watched the content, would be $$\frac{p1 \times (1 - p2)}{p1 + p2 - (p1 \times p2)}.$$

Similarly, the probability that the first occupant did not watch the content and the second occupant did watch the content, given that the household watched the content, would be $$\frac{(1 - p1) \times p2}{p1 + p2 - (p1 \times p2)}.$$

And the probability that both the first and second occupant watched the content, given that the household watched the content, would be $$\frac{p1 \times p2}{p1 + p2 - (p1 \times p2)}.$$

Though only the equations for the three combinations of viewers in a household of two occupants have been illustrated, it will be appreciated that the system uses similar equations for calculating the probabilities of different combinations of viewers in households having more occupants.

In some embodiments, when attributing viewed content to individuals based on individual viewing probabilities, the system may instead treat the viewing behaviors of individuals within a household as being dependent on each other. That is, whether an individual views a piece of content may be influenced by the viewing decisions of others in the household. Viewing decisions may be influenced differently for content associated with different genres or having different popularities. For example, when a popular show is being viewed in a household, groups of individuals within the household may be more likely to watch the show than their individual viewing probabilities would suggest. Accordingly, the system may maintain an adjustment factor that expresses dependent co-viewing within a household. This adjustment, or Q-factor, is a multiplicative factor used in combination with individual viewing probabilities that represents the viewing dependence of k viewers in a household with n occupants, viewing content having popularity X. That is, Q(n,k)(X) adjusts the probability that k viewers in an n-sized household viewed content with popularity X. The popularity of a show may be expressed as a number between zero and one (inclusive), and may be based on the ratio of the number of VOD requests for that show to the total number of VOD requests. The popularity of a show may also be based on the percentage of live viewers watching a show at a particular time out of the total number of live viewers at that time. The Q-factor may be derived, for example, from survey data that provides what percentage of n-person households with precisely k viewers watch a particular piece of content. Referring to FIG. 1, the Q-factor may be maintained by the system in storage area 135.

For example, consider a household with two occupants, where p1 is the probability that an individual with demographics matching the first occupant would watch a piece of content, where p2 is the probability that an individual with demographics matching the second occupant would watch the piece of content, where it is known that the household viewed the content (such as from the viewership information), where the content has popularity x, and assuming dependence in viewing. Using the Q-factor, the probability that the first occupant watched the content while the second occupant did not, given that the household watched the content, would now be $$\frac{(Q(2,1)(x) \times p1) - (Q(2,2)(x) \times p1 \times p2)}{(Q(2,1)(x) \times p1) + (Q(2,1)(x) \times p2) - (Q(2,2)(x) \times p1 \times p2)}.$$

The probability that the first occupant did not watch the content while the second occupant did watch the content, given that the household watched the content, would now be $$\frac{(Q(2,1)(x) \times p2) - (Q(2,2)(x) \times p1 \times p2)}{(Q(2,1)(x) \times p1) + (Q(2,1)(x) \times p2) - (Q(2,2)(x) \times p1 \times p2)}.$$

And the probability that both the first and second occupant watched the content, given that the household watched the content, would now be $$\frac{Q(2,2)(x) \times p1 \times p2}{(Q(2,1)(x) \times p1) + (Q(2,1)(x) \times p2) - (Q(2,2)(x) \times p1 \times p2)}.$$

Though only the equations for the three combinations of viewers in a household of two occupants have been illustrated, it will be appreciated that the system uses similar equations for calculating the probabilities of different combinations of viewers in households having more occupants.

In some embodiments, the popularity of the content for which person-level viewership is being assigned may need to be adjusted before determining the appropriate Q-factor to be used for the content. For example, the Q-factor may have been derived from survey data taken for live viewing of content, while the attribution of household viewership information to individuals is being performed for on-demand content, such as VOD content. In many cases, the distribution of viewership percentages of live content may be dissimilar from that of VOD content. For example, a popular live show may capture 20-30% of viewership at a time, while a popular VOD show may only capture 1-2% of VOD transactions. The reduction in popularity may occur due to the greater fragmentation of VOD viewership. As described herein, the system may utilize a scale factor that scales the distribution of viewership over on-demand content to be similar to the distribution of viewership over live content. By applying the scale factor to the popularity rating for VOD content, the system can determine an equivalent popularity rating with respect to live-viewed content. The scaled popularity rating enables the system to select the appropriate popularity-based Q-factor, which as described herein, may be based on survey data from live viewers. In other words, the scale factor enables the system to utilize data derived from one distribution network (e.g., a Q-factor based on individual live viewership surveys) to generate viewing information for another distribution network (e.g., household-level viewing attribution to individuals of VOD viewing).

The scale factor may be derived from historical viewership data for the different distribution networks (e.g., live viewing and on-demand viewing). For example, the system may utilize household viewership information describing live viewing and VOD viewing of content. In some embodiments, the viewership information used for deriving the scale factor may be the same received viewership information for which attribution to individuals is performed. In some embodiments, the viewership information used for deriving the scale factor may be historical viewership information. To derive a scale factor, the system compares what percentages of households view the most popular content across live and VOD viewing. For example, based on the household viewership information, the system may separately rank live content and VOD content by increasing popularity. Starting from least popular to most popular content, the system may then determine the cumulative percentage of households viewing content at increasing popularity levels for each of the types of viewing. The cumulative household viewing percentages may be determined at different intervals, such as when certain percentages of the content in the ranked order are evaluated. For example, the system may calculate the cumulative percentage of households that viewed the first 10% of live-viewed content (according to the ranked order, starting from least popular), the cumulative percentage of households that viewed the first 10% of VOD-viewed content (according to the ranked order, starting from least popular), the cumulative percentages of households that viewed the first 30% of live-viewed content (according to the ranked order, starting from least popular), etc. From the cumulative household viewing percentages of live-viewed and VOD-viewed content, the system can generate an expression that derives a corresponding popularity number for one type of viewed content from a popularity number of the other type of viewed content (e.g., a VOD popularity of 3% corresponds to a live popularity of 75%). The expression may be derived, for example, based on regressions of the cumulative household viewing percentages at the different intervals. In some embodiments, the system may generate different scale factors based on the type of content for which person-level viewership assignment is being performed, such as different scale factors for different genres of the content. Referring to FIG. 1, the scale factor may be maintained by the system in storage area 135.

Once the system performs the attribution to individuals for received viewership information, the server computer 110 may maintain the individual attribution in storage area 135. The attribution of viewership to individuals may also be shared with content distributor servers 115 and other third-party servers, such as advertisers.

Flows for Person-Level Viewership Assignment

Figure 4:
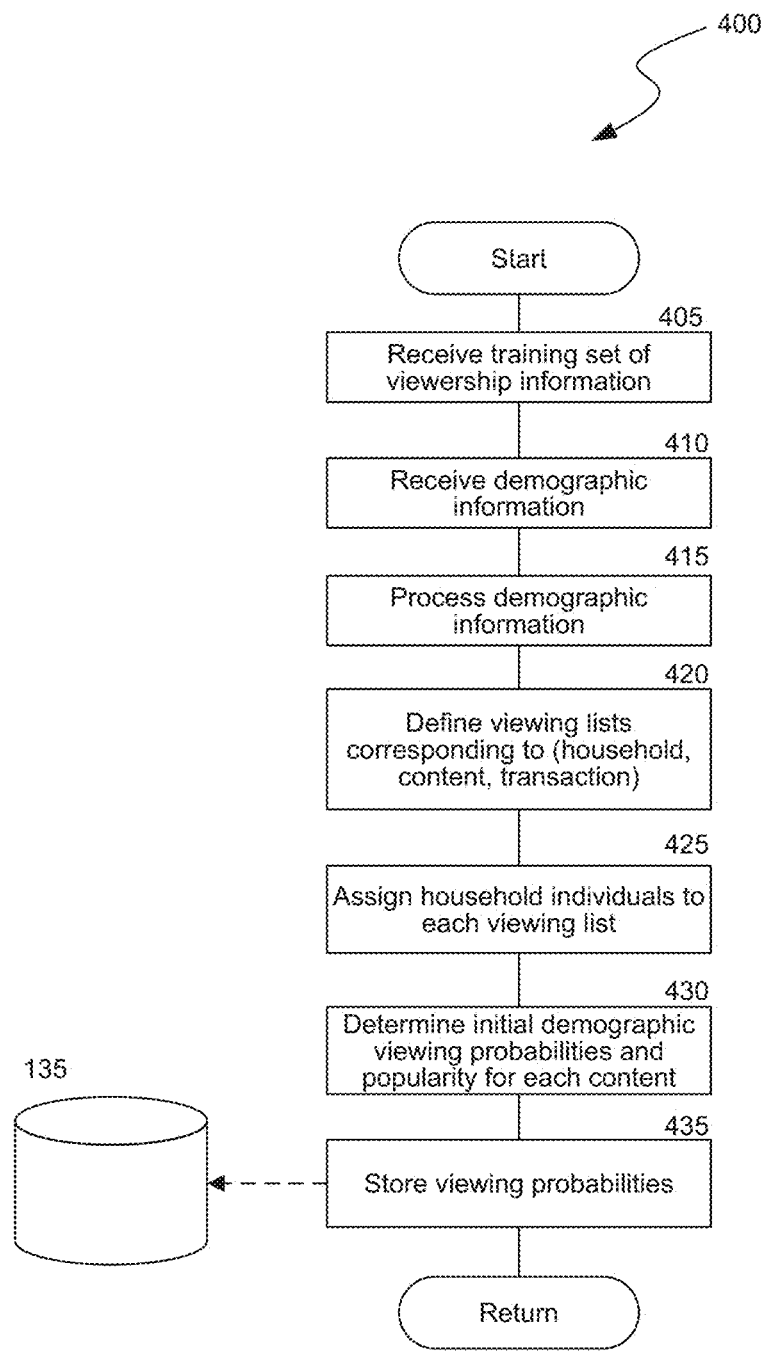
FIG. 4 is a flow diagram of a process for setting initial individual viewing probabilities and content popularity values for different pieces of content, across different demographic categories, based on a set of training data.

FIG. 4 is a flowchart illustrating an example process 400, implemented by the person-level viewership attribution system, for generating initial person-level viewership probabilities based on demographics. The initial person-level viewing probabilities are used as the seed values for the subsequent attribution of individuals to household-level viewership, and may or may not reflect accurate probabilities. As described herein, the system will update the initial probabilities each time individuals are attributed to viewership information, and the person-level viewing probabilities will thereby converge on more accurate values.

At a block 405, the system receives a training set of viewership information to be used for generating initial person-level probabilities. The training set may reflect the average viewing behaviors of households. For example, the training set may be based on recent viewing behavior, such as over several weeks or months, from a representative sample of viewing households. The training set may reflect the known viewing behaviors of individuals, based on, for example, historical individualized viewership information.

At a block 410, the system receives demographic information, such as from the demographics provider server 120. The system may receive demographic information for each of the viewing households captured in the training set of viewership information or may receive average demographic information for representative regions (e.g., neighborhood, ZIP code, city, etc.) in which each of the viewing households are located. The demographic information may provide, for each household, the number of occupants in the household, as well as information (e.g., age, gender, education level, income level, purchase history) for each of the individuals.

At a block 415, the system processes the received demographic information to determine the size of different population segments. For example, the system may determine the number of people, as reflected in the demographic information, that belong to each demographic group (e.g., the number of males, the number of females, the number of people for whom their highest education level is high school, the number of people for whom their highest education level is college, etc.). The system may also determine the size of the total population as reflected in the demographic information. The population counts generated by the system may be based on the entire set of received demographic information, or may be based only on the demographic information corresponding to households that were observed in the training set of viewership information. As a further example of processing the demographic information, the system additionally identifies which demographic information matches which households in the training set. Matching may be performed based on, for example, matching addresses associated with the demographic information and the training set. By doing so, the system determines the number of occupants and characteristics of occupants for each household represented in the training set.

At a block 420, the system defines viewing lists based on the training set of viewership information. As described herein, each viewing list will list the individual viewers assigned to a viewing event. The viewership information, based on which the viewing lists are defined, provides what content was viewed at a viewing household at a particular time. Accordingly, each viewing list is characterized by a viewing household, viewed content, and a viewing transaction, and lists the assigned viewers. A viewing transaction may represent a viewing activity at a particular date and time or may represent a particular VOD request. Thus if the same content is viewed at the same household multiple times, each viewing will be represented by a different transaction, each of which will correspond to a different viewing list. Accordingly, the viewing lists represent each of the viewing activities represented in the training set of viewership information for each household.

At a block 425, for each viewing list characterizing content viewed at a household during a transaction (e.g., a particular occurrence of viewing), the system assigns individuals from the household to the viewing list. In other words, the system makes a determination of which household individuals it will treat as having viewed the content. As described herein, the assignment at the block 425 is used to generate initial viewing probabilities which may be subsequently refined. Accordingly, since the system will later refine the probabilities, different approaches may be used at block 425 to assign household individuals to viewing lists. In some embodiments the system may assign everyone in each household to every viewing list characterized by that household. In some embodiments the system may assign a random subset of people in each household to every viewing list characterized by that household. In some embodiments the system may assign the result of interpolating an assignment of every individuals of the household with the result of an assignment of a random subset of household individuals.

At a block 430, based on the viewing lists, the system determines initial viewing probabilities for each piece of content in the viewership information. The system may generate demographic-specific viewing probabilities for each demographic category. For example, the system may determine the viewing probabilities of women for a particular piece of content based on the number of women who were assigned to viewing the content (as expressed in the viewing lists corresponding to the content) and the total number of women (as determined, for example, at block 415). The system may repeat the calculation for each piece of content represented in the viewership information and for each demographic category represented in the demographic information. The system may also determine an overall content popularity for each piece of content, based on, for example, the number of people assigned to viewing the content and the total number of viewers, or based on the number of transactions associated with the content and the total number of transactions.

At a block 435, the per-content demographic viewing probabilities and content popularities are saved, such as in storage area 135. As described herein, the saved probabilities will be subsequently used by the system to perform person-level viewership assignment as new viewership information is received. The saved probabilities will also be updated according to the new viewership information. The process 400 then returns.

Figure 5:
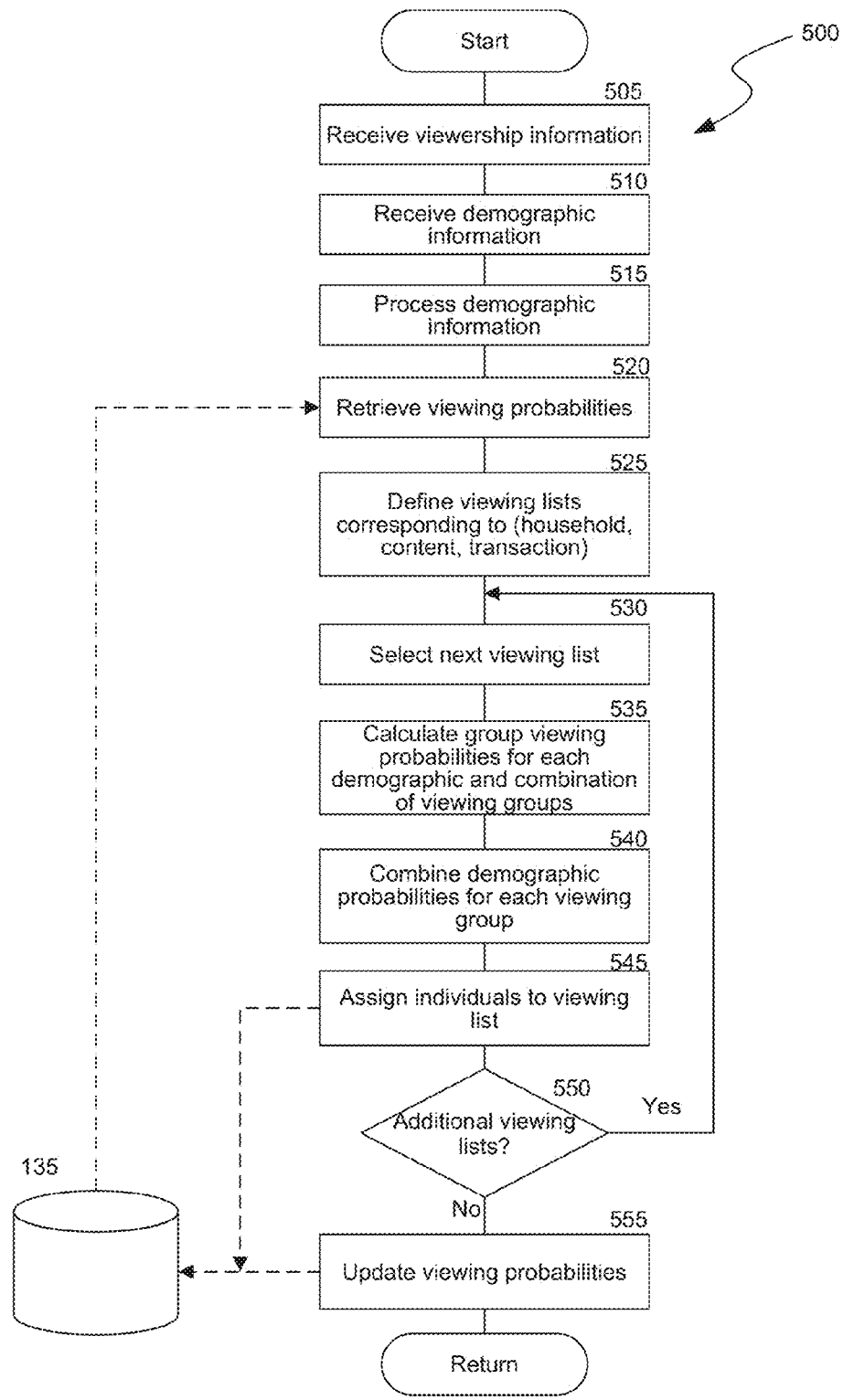
FIG. 5 is a flow diagram of a process for attributing individual viewers of a household to household-level viewership information based on demographic data for households and individual viewing probabilities.

FIG. 5 is a flowchart illustrating an example process 500, implemented by the system, for assigning individuals within a household to viewing events associated with the household. At a block 505 the system receives household viewership information for which individual viewer attribution is desired. As described herein, the received viewership information describes viewing activities at a household or other level (e.g., neighborhood, ZIP code, town, etc.), but does not identify the individuals within each household who viewed the content.

At a block 510, the system receives demographic information, such as from the demographics provider server 120. The system may receive demographic information for each of the viewing households captured in the viewership information or may receive average demographic information for representative regions (e.g., neighborhood, ZIP code, city, etc.) in which each of the viewing households are located. The demographic information may provide, for each household, the number of occupants in the household, as well as information (e.g., age, gender, education level, income level, purchase history) for each of the individuals.

At a block 515, the system processes the received demographic information to determine the size of different population segments. For example, the system may determine the number of people, as reflected in the demographic information, that belong to each demographic group (e.g., the number of males, the number of females, the number of people for whom their highest education level is high school, the number of people for whom their highest education level is college, etc.). The system may also determine the size of the total population as reflected in the demographic information. The population counts generated by the system may be based on the entire set of received demographic information, or may be based only on the demographic information corresponding to households that were observed in the received viewership information. As a further example of processing the demographic information, the system identifies which demographic information matches which households in the viewership information. Matching may be performed based on, for example, matching addresses associated with the demographic information and viewership information. By doing so, the system determines the number of occupants and characteristics of occupants for each household represented in the viewership information. In the event that household addresses cannot be matched with specific demographic information, the demographics of the household may be estimated based on regional (e.g., zip code, county) demographic information.

At a block 520 the system retrieves viewing probabilities and popularity information associated with content, for example from storage area 135. As described herein, the viewing probabilities and popularity information for pieces of content may have been initially generated by training data, such as through the process 400, and may be subsequently refined through the process 500.

At a block 525, the system defines viewing lists based on the received viewership information, which describes what content was viewed by a viewing household during the span of a particular viewing period. Each viewing list is characterized by a viewing household, viewed content, and a viewing transaction. A viewing transaction may represent a viewing activity at a particular date and time or may represent a particular VOD request. Thus if the same content is viewed at the same household multiple times, each viewing will be represented by a different transaction, each of which will correspond to a different viewing list. Accordingly, the viewing lists represent each of the viewing activities represented in the viewership information. Each viewing list, as described herein, will list the individual viewers assigned to that viewing event.

At a block 530, the system selects the next viewing list for which individual viewers will be assigned.

At a block 535, the system calculates viewing probabilities for the viewing event corresponding to the selected viewing list. Viewing probabilities will be calculated for all possible combinations of non-zero viewers within the household (e.g., all combinations of 1 to n viewers within an n-sized household) and all demographic categories (e.g., age, gender, highest education level, etc.).

When calculating the viewing probability for a given viewership combination and demographic, the system uses the retrieved viewing probabilities for the content (corresponding to the viewing list) for that demographic category. The individual viewing probabilities used in the calculation will be selected based on which attribute the individuals, in the viewership combination being considered, have for that demographic category. The joint individual probabilities are then conditioned by the fact that at least one person in the household viewed the content, and further adjusted by a Q-factor that accounts for viewing dependence within a household. As described above, the form of the equation used for calculating the probability of viewing by a group, as well as the selection of the Q-factor, depends on the size n of the household associated with the viewing list, and the size k of the combination of viewers currently being evaluated. The selection of the Q-factor additionally depends on the popularity of the content for which viewership information is being attributed to individuals. As described herein, the system maintains different Q-factors corresponding to different popularity levels of content. For example, the system may maintain Q-factors for n-sized households and k-sized viewing lists viewing content having a 10% popularity, identified by $Q(n,k)(0.1)$, Q-factors for n-sized households and k-sized viewing lists viewing content having a 25% popularity, identified by $Q(n,k)(0.25)$, etc. Furthermore, prior to selecting the appropriate Q-factor for a piece of content, the system may scale the content's popularity number according to a scale factor. The scale factor accounts for differences in the viewership of content across different distribution networks and types of viewing. For example, content with a 3% popularity in VOD viewing may correspond to a 65% popularity in live-viewing. Accordingly, if Q-factors were derived from live-viewing data, and if the system is performing attributions of individuals for VOD content, then based on the scale factor, Q-factors $Q(n,k)(0.65)$ may be used for the VOD content having a 3% popularity. Thus, for example, when evaluating the probability that one individual in a two-person household, with the first occupant of the household viewing the content and the second occupant of the household not viewing the content, and the content has a popularity of x % when adjusted by the scale factor, the system calculates the probability of viewing for that combination using an equation of the form $$\frac{(Q(2,1)(x) \times p1) - (Q(2,2)(x) \times p1 \times p2)}{(Q(2,1)(x) \times p1) + (Q(2,1)(x) \times p2) - (Q(2,2)(x) \times p1 \times p2)}.$$

It will be appreciated that the system utilizes similar equations for households with different numbers of occupants and a different number of individual viewers currently being evaluated. The system performs these calculations for all combinations of viewers within the household and for all demographic categories.

For example, consider the situation where a viewing list corresponds to content viewed in a household of two occupants. As illustrated in FIG. 3, there are three combinations of non-zero viewers for such a household. Also assume that there are two demographic categories (age and gender)

contained in the demographic information. The system would then calculate a total of six viewing probabilities for the different combinations of viewing groups and characteristics.

Continuing with the example above, further consider the situation in which the system is presently calculating the viewing probability that both viewers (in the two-occupant household) are viewing VOD content and the demographic category of the viewers' gender is being considered. Assume that the first occupant of the household is a male and the second occupant of the household is a female. Further assume that the current individual viewing probability of a male viewing the content is 0.2, and the current individual viewing probability of a female viewing the content is 0.1. Further assume that the content has an overall popularity among VOD viewing of y, and that the system has maintained scale factors that indicate that a VOD viewing popularity of y corresponds to a live-viewing popularity of x. If the Q-factors were derived from live-viewing data, and thus the content popularity must be scaled according to the scale factor, then the probability of that particular viewership combination, for that demographic category, may then be calculated by $$\frac{Q(2, 2)(x) \times 0.2 \times 0.1}{(Q(2, 1)(x) \times 0.2) + (Q(2, 1)(x) \times 0.1) - (Q(2, 2)(x) \times 0.2 \times 0.1)}.$$

The system would additionally calculate the remaining five combinations of non-zero viewership combinations and demographics. As described above, different Q-factors and equation forms will be used for the different numbers of viewers in each combination (though the household size is fixed), and different individual viewing probabilities will be used for the other demographic category (i.e., age).

At a block 540, the probabilities for different viewership combinations and different demographic categories are combined into a single probability for each viewership combination. That is, continuing with the example described above, the six probabilities calculated at the previous step (for three viewership combinations in a household of two, and two demographic categories to be considered) are combined into three probabilities (for the different viewership combinations). For each viewership combination, the probabilities calculated corresponding to the different demographic categories may be combined by averaging the different probabilities (e.g., taking the average of the viewership combination probability calculated based on gender with the viewership combination probability calculated based on age). The average may weigh the probabilities calculated for different demographic categories differently.

At a block 545, the system assigns individuals from the household to the viewing list based on the probabilities calculated for the different viewership combinations. In some embodiments, the viewership combination with the highest probability is used. In some embodiments, a viewership combination is selected from the available viewership combinations according to the probability generated for it (e.g., if the conditional probability of a viewership combination calculated a 25% probability, it has a 25% probability of being selected). The individuals corresponding to the selected viewership combination are then assigned to the viewing list. The viewing list may then be saved by the system, such as in storage area 135. In that way, a system operator or third party (such as an advertiser or a content distributor) may perform viewership analytics using the individual viewership data generated by the system.

At a decision block 550, the system determines whether there are any additional viewing lists (corresponding to other viewing events) for which person-level viewership needs to be assigned. If there are, the process 500 returns to block 530 to select the next viewing list for processing. If there are not, the process 500 continues to a block 555.

Once the system has assigned person-level viewership for all viewing lists, at the block 555 the system updates the individual viewing probabilities for different pieces of content. To update the viewing probabilities, the system may use the existing viewing probabilities (such as was retrieved at block 520) combined with the person-level viewership assignments made since the probabilities were last updated (e.g., during the process 500). The system updates both the demographic-specific individual viewing probabilities (e.g., the probability that a male watches a particular piece of content, the probability that a female watches a particular piece of content, etc.), as well as the overall viewing probability (or popularity), for content.

The inclusion of the new person-level viewership attributions in the updated individual viewing probabilities enables the system to converge on more accurate probability values. The feedback provided by including new person-level viewership attributions enables the system to converge even when the initial person-level viewing probabilities are inaccurate. For example, consider a situation in which a piece of content skews heavily towards women and away from men. Further consider that the initial viewing probabilities, based on flawed or non-representative training data, said that women have a 1% chance of watching the content while men have a 90% chance of watching the content. When viewership information is received that indicates households viewed the content, the demographics for that house will likely have women (due to how the content truly skews among men and women). As the system assigns person-level viewership, even though the initial probabilities favor assigning men and disfavor assigning women, some women will inevitably be assigned to having viewed the content due to the demographic characteristics of the viewing households. As the viewing probabilities of men and women are recalculated for the content, the probabilities begin to shift to be more favorable to women (and less favorable to men) due to the inclusion of women in the person-level viewership assignment. Over time these probabilities will converge on a more representative number for each of the demographic categories.

Though illustrated as occurring after all viewing lists have been processed, the viewing probabilities may be updated after each viewing list is processed, after a fixed number of viewings lists have been processed, after a fixed period of time, etc. The updated viewing probabilities are then saved, such as in storage area 135, where they may be utilized by subsequent processes for performing person-level viewership assignment. After updating and saving the viewing probabilities, the process 500 returns.

Example Person-Level Viewership Assignment Reports

By providing probabilistic viewership information for content on an individual level, the system enables users to perform more precise analytics of viewership information. For example, advertisers may use the person-level viewership information to generate advertising rates for advertisements included with live content. As a further example, advertisers may use the person-level viewership information to determine which advertisements to insert into VOD content.

FIGS. 6 through 10 illustrate example reports that may be generated by the system using the generated person-level viewership information. FIG. 6, for example, illustrates an example report showing the ratios of viewers to transactions for different genres of content. As described, the system may receive information indicating the genre of each content in the viewership information. The system may generate the report by determining, for each genre, the number of individual viewers for the genre and the number of transactions (e.g., VOD requests, instances of content viewing, Internet video retrieval, etc.).

FIG. 7 illustrates an example report showing the content viewership of different demographics across different days and times. In some embodiments the viewership numbers for each demographic may be absolute. In some embodiments the viewership numbers for each demographic may be relative. For example, as illustrated in FIG. 7, the person-level viewership information may show that on Monday through Friday, from 17:00 to 19:00, there are 13% more women aged 18-34 than there are men aged 18-34 viewing content.

Figure 8:
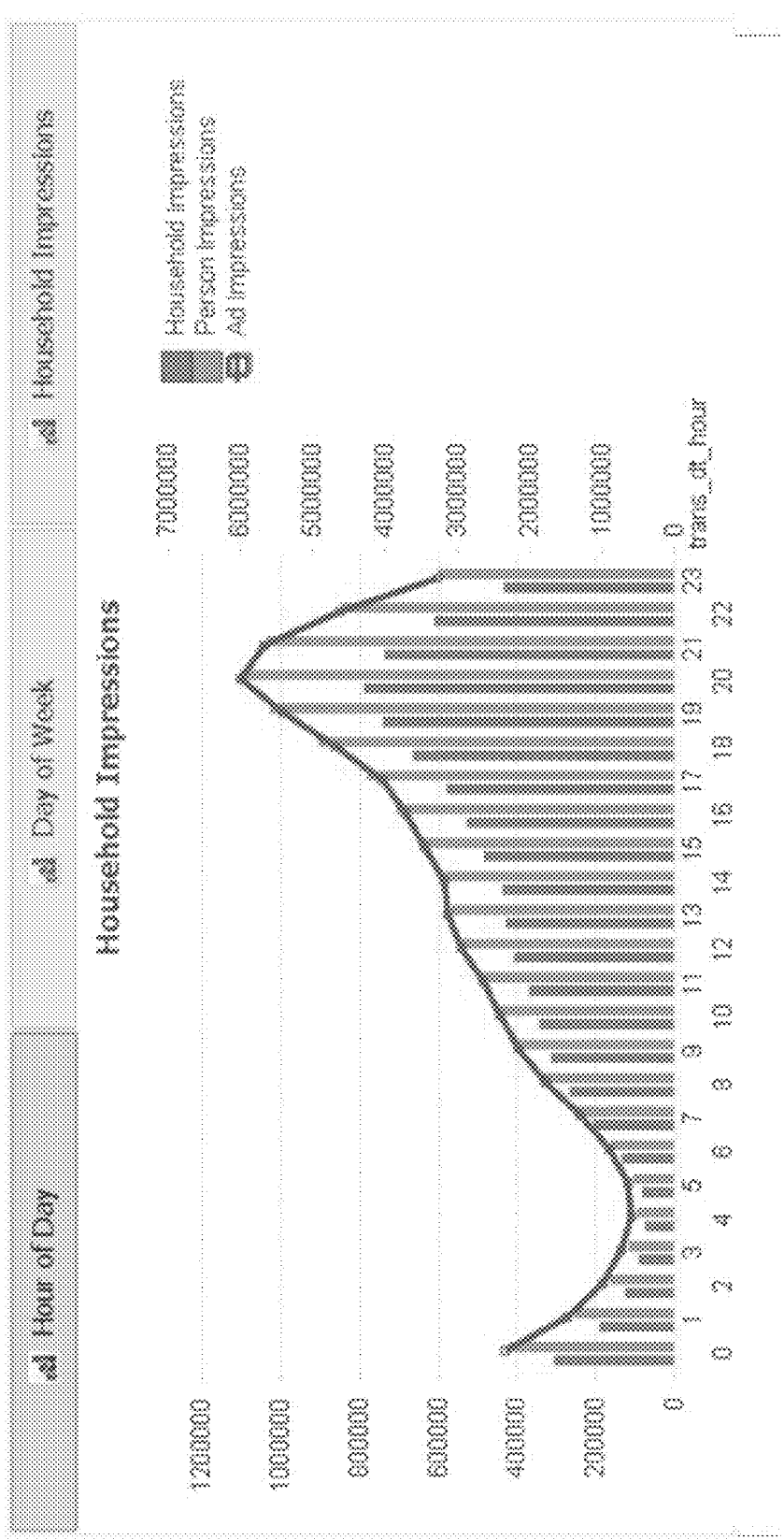
FIG. 8 is an example graphical output of the system illustrating household and person breakdown results at the hourly level.
Figure 9:
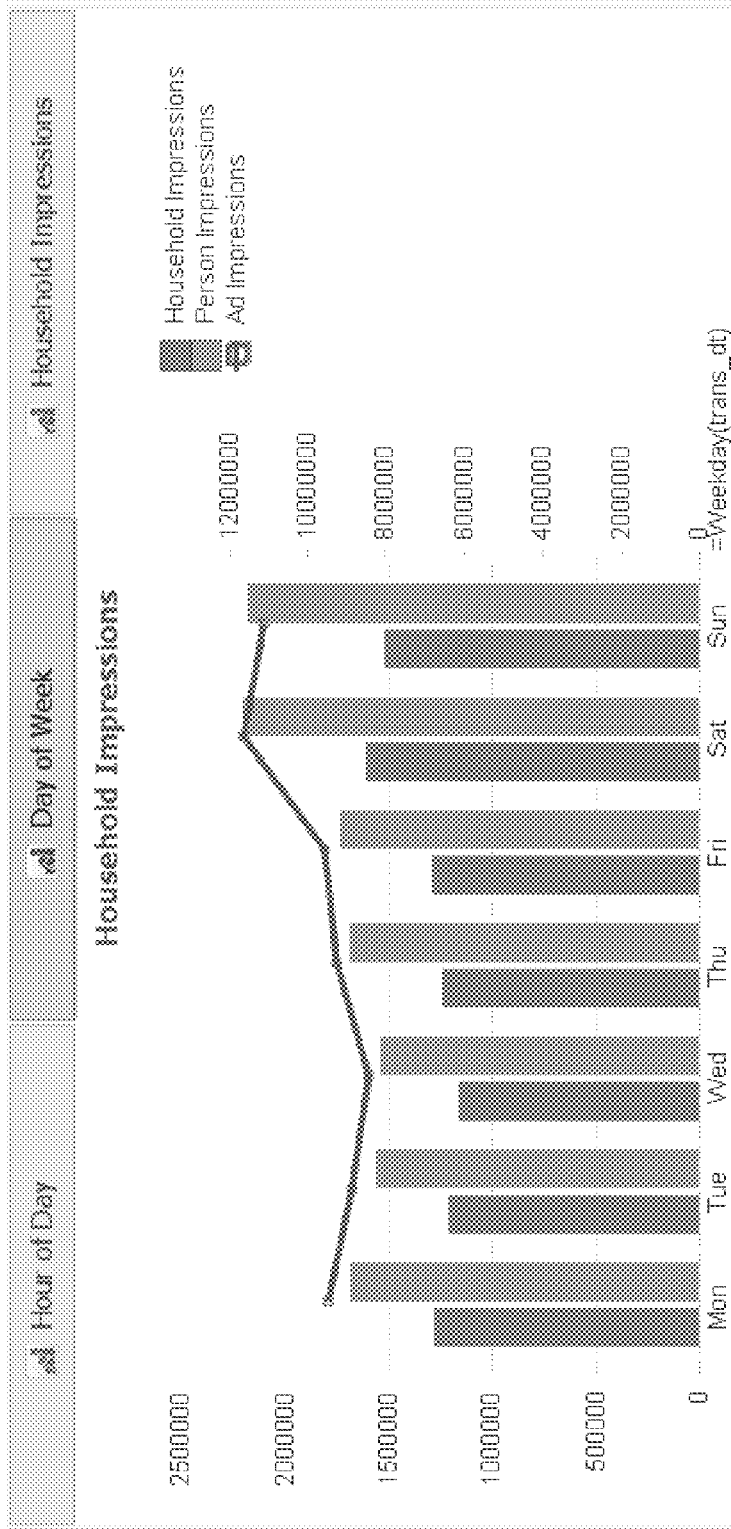
FIG. 9 is an example graphical output of the system illustrating household and person breakdown results at the daily level.
Figure 10:
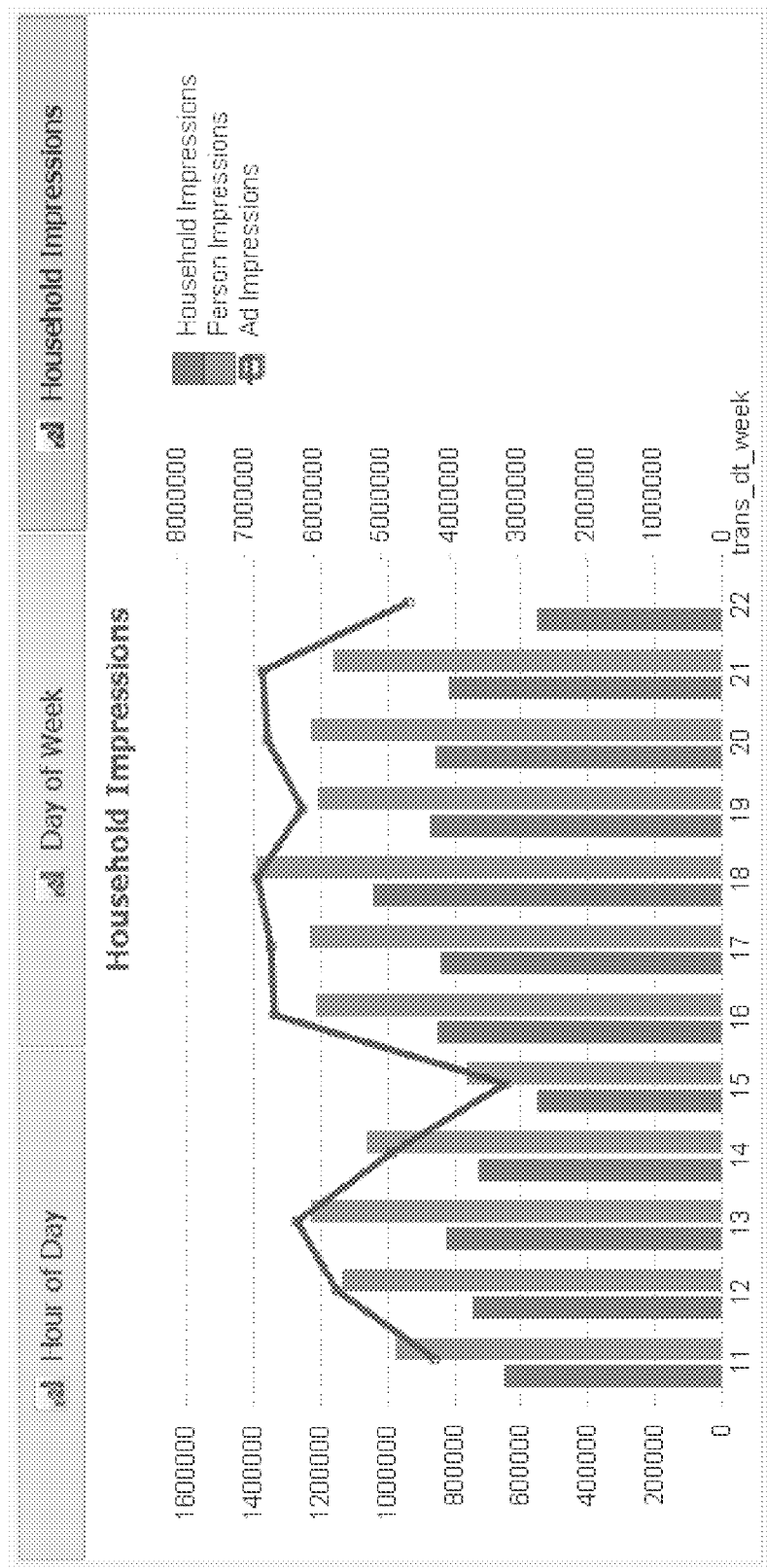
FIG. 10 is an example graphical output of the system illustrating household impression data.

FIG. 8 illustrates an example graphical output of the system showing household and person-level impressions plotted over the time of day. FIG. 9 illustrates an example graphical output of the system showing household and person-level impressions plotted over the day of the week. And FIG. 10 illustrates an additional example graphical output of the system showing household and person-level impressions.

ALTERNATIVE EMBODIMENTS

In some embodiments, if the system cannot determine what piece of content is associated with a transaction in the viewership information, or if the transaction is associated with a piece of content for which insufficient information is available (e.g., the system has not trained individual viewing probabilities or popularity information for the content), the system may use the average of values for other content distributed on the same network as initial values for the particular piece of content.

In some embodiments, if demographic information is not available for a household contained in the viewership information, demographic information based on an average of nearby households, the ZIP code in which the household is located, or other may be used.

In some embodiments the system may maintain historical viewership information. The system may periodically generate revised individual viewing probabilities and content popularity values based on the historical viewership information and newly received viewership information. In some embodiments, the system may discard or ignore historical viewership information beyond a certain age. In some embodiments, the system weighs more recent viewership information more heavily than older viewership information.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A computer-implemented method for attributing household viewership information to individuals in a household; the method comprising:

maintaining, at a computing system, for each of one or more demographic categories a probability that an individual having a possible attribute associated with the demographic category would view a video content, each of one or more demographic categories associated with a plurality of possible attributes;

receiving, at the computing system, viewership information describing a viewing event of the video content in a household;

receiving, at the computing system, demographic information for the household, the demographic information comprising a number of individuals associated with the household and attributes of each of the individuals;

determining, at the computing system, based on the number of individuals associated with the household, possible combinations of viewing groups for the household, wherein each viewing group is comprised of at least one individual associated with the household;

calculating, at the computing system, for each of the viewing groups, a probability that the viewing group viewed the video content based on the maintained probabilities for the one or more demographic categories;

adjusting, at the computing system, the probabilities for each of the viewing groups by a viewing dependency factor, the viewing dependency factor based on the viewing dependence of the at least one individual in each viewing group;

attributing, at the computing system, based on the probabilities for the viewing groups, the at least one individual of the viewing group having the highest probability to the video content; and generating, at the computing system, a report displaying a number of individuals viewing the video content over a period of time.

2. The computer-implemented method of claim 1, further comprising updating, at the computing system, the maintained probabilities for the one or more demographic categories for the video content based on the attribution of individuals to the video content.

3. The computer-implemented method of claim 1, wherein adjusting the probabilities for each of the viewing groups by a viewing dependency factor comprises:
  maintaining, at the computing system, a plurality of Q-factors that express viewing dependence in the household, wherein each Q-factor is associated with the number of individuals associated with the household and a number of viewers of the video content, wherein the number of viewers comprises a number less than or equal to the number of individuals associated with the household; and
  adjusting, at the computing system, prior to attributing one or more individuals to the video content, the probabilities for each of the viewing groups by the Q-factor associated with a number of viewers corresponding to a number of persons in each viewing group.

4. The computer-implemented method of claim 3, wherein each Q-factor is further associated with a popularity rating of a show, and wherein adjusting the probabilities for each of the viewing groups comprises selecting a Q-factor based on a popularity rating of the video content.

5. The computer-implemented method of claim 4, further comprising adjusting the popularity rating of the video content by a scale factor prior to selecting the Q-factor.

6. The computer-implemented method of claim 1, wherein calculating the probability that a viewing group viewed the video content comprises, for each of the one or more demographic categories:
  determining, based on the demographic information, the attributes of each of the individuals associated with the household that correspond to a possible attribute of the plurality of attributes associated with the demographic category;
  calculating a probability that the at least one individual in the viewing group viewed the video content based on the probabilities for the demographic category and the determined attributes of each individual that correspond to a possible attribute of the plurality of attributes associated with the demographic category;
  calculating a probability that at least one individual associated with the household viewed the video content based on the probabilities for the demographic category and the determined attributes of each individual that correspond to a possible attribute of the plurality of attributes associated with the demographic category; and
  calculating, for the demographic category, the probability that the viewing group viewed the video content based on the probability that the at least one individual in the viewing group viewed the video content and the probability that at least one individual associated with the household viewed the video content.

7. The computer-implemented method of claim 6, wherein the one or more demographic categories comprises at least two demographic categories, and wherein calculating the probability that a viewing group viewed the video content further comprises calculating an average viewing probability for the viewing group based on the probabilities for each of the at least two demographic categories.

8. The computer-implemented method of claim 1, wherein the viewing event is a live television broadcast.

9. The computer-implemented method of claim 1, wherein the viewing event is a video-on-demand transmission.

10. A non-transitory computer-readable medium encoded with instructions that, when executed by a processor, perform a method for attributing household viewership information to individuals in a household, the method comprising:
  maintaining for each of one or more demographic categories a probability that an individual having a possible attribute associated with the demographic category would view a video content, each of one or more demographic categories associated with a plurality of possible attributes:
  receiving viewership information describing a viewing event of the video content in a household;
  receiving demographic information for the household, the demographic information comprising a number of individuals associated with the household and attributes of each of the individuals;
  determining, based on the number of individuals associated with the household, possible combinations of viewing groups for the household, wherein each viewing group is comprised of at least one individual associated with the household;
  calculating, for each of the viewing groups, a probability that the viewing group viewed the video content based on the maintained probabilities for the one or more demographic categories;
  adjusting the probabilities for each of the viewing groups by a viewing dependency factor, the viewing dependency factor based on the viewing dependence of the at least one individual in each viewing group;
  attributing, based on the probabilities for the viewing groups, the at least one individual of the viewing group having the highest probability to the video content; and
  generating a report displaying a number of individuals viewing the video content over a period of time.

11. The non-transitory computer-readable medium of claim 10, wherein the method further comprises: updating the maintained probabilities for the one or more demographic categories for the video content based on the attribution of individuals to the video content.

12. The non-transitory computer-readable medium of claim 10, wherein adjusting the probabilities for each of the viewing groups by a viewing dependency factor comprises:
  maintaining a plurality of Q-factors that express viewing dependence in the household, wherein each Q-factor is associated with the number of individuals associated with the household and a number of viewers of the video content, wherein number of viewers comprises a number less than or equal to the number of individuals associated with the household; and
  adjusting, prior to attributing one or more individuals to the video content, the probabilities for each of the viewing groups by the Q-factor associated with a number of viewers corresponding to a number of persons in each viewing group.

13. The non-transitory computer-readable medium of claim 12, wherein each Q-factor is further associated with a popularity rating of a show, and wherein adjusting the probabilities for each of the viewing groups comprises selecting a Q-factor based on a popularity rating of the video content.

14. The non-transitory computer-readable medium of claim 13, further comprising adjusting the popularity rating of the video content, by a scale factor prior to selecting the Q-factor.

15. The non-transitory computer-readable medium of claim 10, wherein calculating the probability that a viewing group viewed the video content comprises, for each of the one or more demographic categories:
- determining, based on the demographic information, the attributes of each of the individuals associated with the household that correspond to a possible attribute of the plurality of attributes associated with the demographic category;
- calculating a probability that the at least one individual in the viewing group viewed the video content based on the probabilities for the demographic category and the determined attributes of each individual that correspond to a possible attribute of the plurality of attributes associated with the demographic category;
- calculating a probability that at least one individual associated with the household viewed the video content based on the probabilities for the demographic category and the determined attributes of each individual that correspond to a possible attribute of the plurality of attributes associated with the demographic category; and
- calculating, for the demographic category, the probability that the viewing group viewed the video content based on the probability that the at least one individual in the viewing group viewed the video content and the probability that at least one individual associated with the household viewed the video content.

16. The non-transitory computer-readable medium of claim 15, the one or more demographic categories comprises at least two demographic categories, and wherein calculating the probability that a viewing group viewed the video content further comprises calculating average viewing probability for the viewing group based on the probabilities for each of the at least two demographic categories.

17. The non-transitory computer-readable medium of claim 10, wherein the viewing event is a live television broadcast.

18. The non-transitory computer-readable medium of claim 10, wherein the viewing event is a video-on-demand transmission.

* * * * *